INVENTOR.
ELIEZER L. SHAINMARK
BY
J.B. Felshin
ATTORNEY.

United States Patent Office 3,344,628
Patented Oct. 3, 1967

3,344,628
AUTOMOBILE ANTI-THEFT DEVICES
Eliezer L. Shainmark, 2686 Bailey Ave.,
Bronx, N.Y. 10463
Filed Aug. 25, 1965, Ser. No. 482,347
5 Claims. (Cl. 70—255)

ABSTRACT OF THE DISCLOSURE

The anti-theft device comprises a circuit including a battery, a first switch, a starter motor and a second switch, all in series circuit which includes an ignition key switch in series circuit with a relay and a battery to close the first switch. The second switch is encased in a box and is normally biased away from closing position by a spring. However, a key tumbler in the box is provided with means for moving the second switch to closing position. The key tumbler may be operated to retain the second switch in the box in opened position. When it is opened, closing of the first switch by operation of an ignition key will nevertheless not operate the starter. Thus when the driver leaves the car he operates the tumbler to open the second switch in the box so that the motor cannot be started.

---

This invention relates to automobile anti-theft devices.

It is particularly related to key controlled means to prevent energization of the starter motor of a vehicle even when the ignition switch is turned on.

An object of this invention is to provide an anti-theft system for a vehicle such as an automobile, and including a closed box in which a switch is located and a key operated tumbler in the box which may be operated by insertion of a key thereinto for controlling the switch whereby when the vehicle is being normally operated the tumbler is actuated to close the switch and when the operator leaves the car the tumbler is actuated to open the switch so that the car cannot be started unless the key is again inserted into the tumbler and the tumbler actuated to again close the switch.

A further object of this invention is to provide an anti-theft system of the character described in which a box is closed except that the key receiving opening end of the tumbler is exposed, so that no one can get into the box to tamper with the switch and the box also being provided with openings through which the wires for the electric circuit for the starter motor pass.

A further object of this invention is to provide an anti-theft system of the character described in which said box is mounted in back of the dash board with the key tumbler disposed below the dash board so that access can be had thereto by the operator.

A still further object of this invention is to provide a durable anti-theft system of the character described which shall be relatively inexpensive to manufacture and practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

Brief description of the several views of the drawing

In the accompanying drawing, in which is shown an illustrative embodiment of this invention.

Detailed description of the invention

Figure 1:
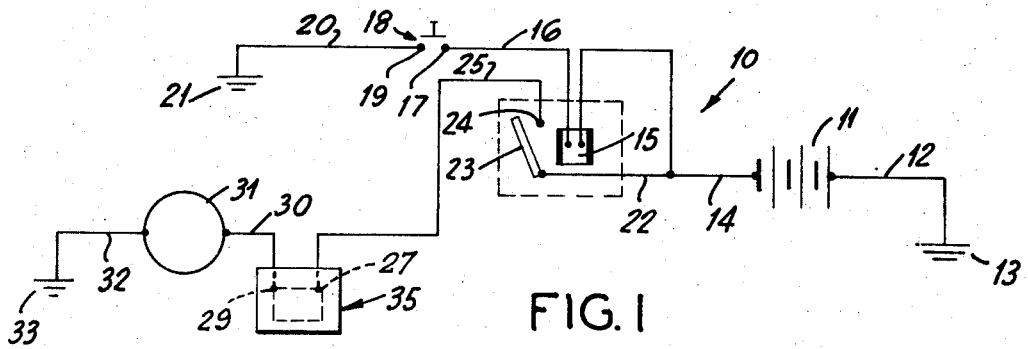
FIG. 1 is a wiring diagram illustrating the anti-theft system embodying the invention.
Figure 2:
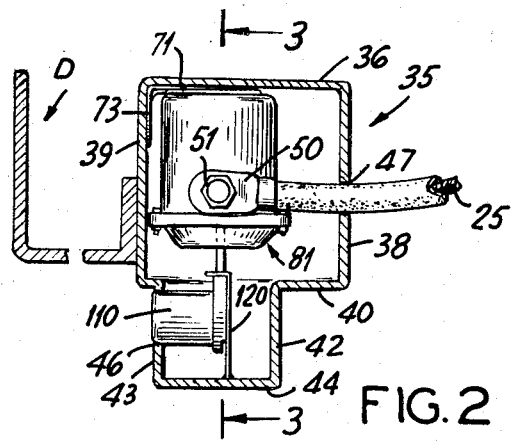
FIG. 2 is a vertical cross-sectional view illustrating a portion of the dash board and the box in which the anti-theft control device is housed.
Figure 3:
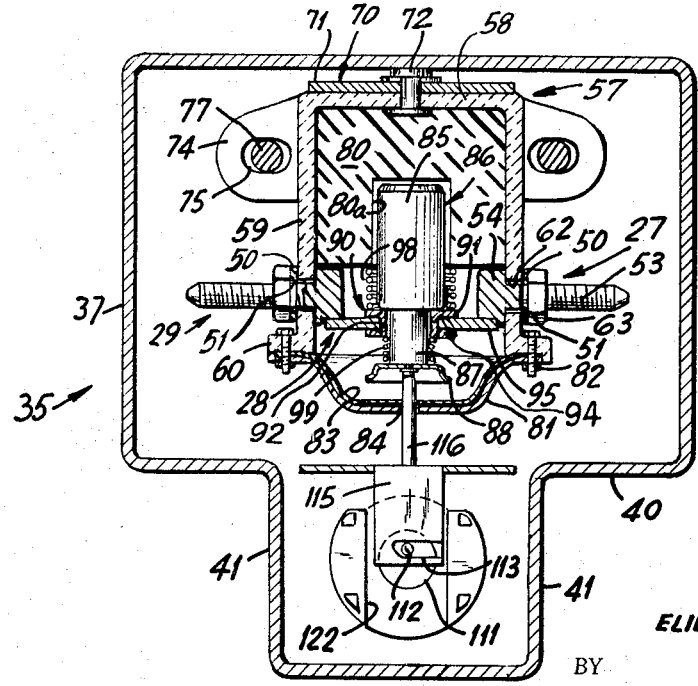
FIG. 3 is an enlarged cross-sectional view taken on line 3—3 of FIG. 2.

Referring now in detail to the drawing, 10 designates the wiring diagram of FIG. 1. This wiring diagram includes the usual battery 11 connected by wire 12 to ground 13. The battery is also connected by wire 14 to one side of a relay coil 15. The other side of the relay coil is connected by wire 16 to one terminal 17 of the usual ignition switch 18. The other side 19 of the ignition switch is connected by wire 20 to ground 21. Wire 14 is connected by wire 22 to a switch arm 23 controlled by the relay coil 15. The switch 23 when closed engages a fixed contact 24 connected by wire 25 to one terminal 27 of the switch 28 to be described in detail hereinafter. The other terminal 29 of said switch is connected by wire 30 to the starter motor 31. Said motor being connected by wire 32 to ground as at 33. The switch 28 and the controls therefor, are all housed in a box 35. The box 35 may be a metal box comprising a top wall 36 from which extend downwardly side walls 37, rear wall 38 and a front wall 39. At the lower ends of walls 37, 38 and 39 is an undershoulder 40 from which extend downwardly side walls 41, a rear wall 42 and front wall 43. Walls 41, 42 and 43 are all interconnected by a bottom wall 44. The front wall 43 is formed with a round opening 46 for the purpose hereinafter appearing. The rear wall 38 is formed with two spaced round openings 47 through which wires 25 and 30 pass. The wires 25 and 30 are insulated by heavy insulation. These insulated wires 25 and 30 have attached to their ends flattened terminal lugs 50 formed with through openings 51. The terminals 27 and 29 each comprise a screw shank 53 passing through the opening 51 of one of the lugs 50. At the inner end of each screw shank 53 is a fixed contact portion 54. Within the box is an insulated switch housing 57 having a top wall 58 and from which extends downwardly a cylindrical wall 59 from which extends outwardly a recessed flange 60. The cylindrical wall 59 is formed with diametrically opposed openings 62 through which the screw shanks 53 pass. A nut 63 screwed to each shank 53 serves to fix the terminals to the housing. The contacts 54 have shoulders to engage the inner surface of the housing. Washers may be interposed between the nut 63 and the lugs 50. A bracket 70 is provided for attaching the housing 57 to the inside of the box. The bracket 70 may have a top wall 71 which may be riveted as by rivet 72 to the top wall of the housing 57. The bracket 70 has a rear wall 73 formed with wings 74 having openings 75 to receive bolts or fastening means 77 for attaching the bracket to front wall 39 of box 35. Within the housing is an insulation block 80 resting on the contacts 54. The block 80 is preferably made of electrically insulated material. Said block 80 is formed at its underside with a socket 80a for the purpose hereinafter appearing. Attached to the underside of flange 60 is a bottom cover 81 having flanges received in the recess of said flange 60. The cover is attached to the flange by means of any suitable bolts or rivets 82. An insulating liner 83 may be provided between the cover 81 and the recessed flanges 60. The cover 81 is formed with a central opening 84 for the purpose hereinafter appearing.

Slidable in said axial socket 80a is the upper end 85 of a slidable plunger 86. The plunger 86 has a reduced shank portion 87 extending below the upper portion 85. Riveted to the lower end of the shank 87 is a flange member 88. Slidable on the shank 87 is an upper insulating member 90 having a horizontal annular flange 91 and a downwardly extending sleeve 92. The flange 91 contacts the shoulder at the lower end of the upper portion 85 of the plunger. Received on the lower end of the sleeve 92 is an annular insulating disc 94. Between the flange 91 and the disc 94 and surrounding the sleeve 92 is a metal switch plate 95 which is of sufficient outer diameter to straddle or engage the contacts 54 of the terminals 27, 29. Interposed between the flange 91 of member 90 and the underside of block 80 and surrounding the upper plunger portion 85 is a coil compression spring 98. Interposed between the disc 94 and the flange 88 is a second coil compression spring 99. The lower spring 99 should be a stronger spring than the spring 98 so that when the plunger 86 is raised in the manner hereinafter appearing, spring 99 insures contact of the switch plate 95 with the contact portions 54 of terminals 27, 29.

Key operated means is provided for moving the switch plate 95 out of contact with respect to the contacts 54. To this end there is mounted in the lower portion of the box a key tumbler housing 110, the front end of which is within the opening 46 of the front wall 43. Within the key tumbler housing 110 is a usual key tumbler 111 provided at its rear end with an eccentric pin 112 received in a horizontal slot 113 of a vertically slidable plate 115. By inserting the key into the key tumbler and turning the key, the pin 112 will either raise or lower the plate 115. The plate 115 is fixed to the lower end of a bar 116, passing through the opening 84 in the cover 81 and through an opening in the liner 83. The upper end of the bar 116 contacts the underside of the lower end of the plunger shaft 87. When the key is turned to raise the plate 115 the plunger 86 is moved upwardly, the upper spring 98 is compressed, and then the lower spring 99 presses the switch plate 95 against the contacts 54 to close the switch. Thereafter, when the ignition switch 18 is turned on, the relay 15 will be energized to close switch 23 and the circuit will be completed to the starter motor. This condition prevails when the car is being operated. However, when the operator leaves the car, he will turn the key in a direction for lowering the plate 115 thereby allowing spring 98 to lower the plate 95 and the plunger 86, and thereby opening the switch 28. If thereafter the ignition switch 18 is turned on by any means, the starter motor will not be energized because of the opened switch 28.

If desired the box 35 may be attached to the rear of the dash board D so that only the key tumbler housing 110 is disposed below the dash board and facing the driver.

Attached to the rear end of the tumbler housing 110 is a vertical plate 120 which may be fixed within the box in any suitable manner. The plate 120 may contact the rear of the plate 115 and said plate 115 is slidably mounted for vertical movement in a groove 122 at the rear of the tumbler housing 110. The plate 120 closes the slot 122.

It will thus be seen that there is provided an apparatus and article in which the several objects of this invention are achieved, and which is well adapted to meet the conditions of practical use.

As possible embodiments might be made of the above invention, and as various changes might be made in the embodiment above set forth, it is to be understood that all matter herein set forth and shown in the accompanying drawing, is to be interpreted as illustrative and not in a limiting sense.

I claim:

1. In combination, a circuit, an electric starter motor for a combustion engine of a motor vehicle, in said circuit, a battery in said circuit in series with said electric starter motor, a first switch in said circuit in series with said battery and starter motor, a closed box, a second switch mounted within said box and in said circuit, in series with said electric starter motor and first switch, said second switch comprising a pair of spaced contacts, the leads for said contacts passing to the outside of said closed box through openings formed in said box, a switch plate in said box, means to mount said switch plate for movement within said box for electrically connecting said contacts in one position of said plate, means to bias said switch plate away from said connecting position, releasable key actuated means in said box to urge said switch plate into said connecting position, said box being formed with another opening to permit access of a key into said key actuated means, and ignition key control switch means in said circuit to control said first switch.

2. The combination of claim 1, said key actuated means comprising a tumbler lock having an offset pin and a movable member formed with a slot at right angles to the direction of movement of said member, to receive said pin, and means extending from said movable member to operatively interconnect said movable member with said switch plate mounting means.

3. The combination of claim 2, in combination with a vehicle dash board, said box being attached to said dash board and behind the dash board, and said key receiving end of said tumbler being disposed below said dash board, facing the driver.

4. The combination of claim 2, and means on said switch plate mounting means to bias said switch plate toward connecting position.

5. The combination of claim 4, said second mounted bias means being capable of overcoming the effect of said first mounted biased means.

References Cited

UNITED STATES PATENTS

| | | | |
|---|---|---|---|
| 1,244,671 | 10/1917 | Wikheim | 200—44 |
| 1,664,522 | 4/1928 | Metzroth | 70—237 X |
| 1,727,384 | 9/1929 | Thomas | 70—237 X |
| 2,166,058 | 7/1939 | Kirk | 200—44 X |
| 2,166,061 | 7/1939 | Kirk | 200—44 X |

FOREIGN PATENTS

| | | |
|---|---|---|
| 355,586 | 8/1931 | Great Britain. |

BOBBY R. GAY, *Primary Examiner.*